United States Patent
Harris, Jr. et al.

(10) Patent No.: US 10,212,782 B2
(45) Date of Patent: Feb. 19, 2019

(54) DEVICE AND METHOD FOR MODE CONTROL OF WILDLIFE-FRIENDLY LIGHTING

(71) Applicant: William F. Harris, Jr., Charlotte, NC (US)

(72) Inventors: William F. Harris, Jr., Charlotte, NC (US); Vincent Worley, Charlotte, NC (US)

(73) Assignee: William F. Harris, Jr., Charlotte, NC (US)

( * ) Notice: Subject to any disclaimer, the term of this patent is extended or adjusted under 35 U.S.C. 154(b) by 480 days.

(21) Appl. No.: 14/700,815

(22) Filed: Apr. 30, 2015

(65) Prior Publication Data

US 2016/0323963 A1 Nov. 3, 2016

(51) Int. Cl.
| | |
|---|---|
| H05B 37/02 | (2006.01) |
| H05B 33/08 | (2006.01) |
| A01K 29/00 | (2006.01) |
| F21V 23/04 | (2006.01) |
| F21W 131/10 | (2006.01) |
| F21Y 115/10 | (2016.01) |
| F21Y 113/13 | (2016.01) |

(52) U.S. Cl.
CPC ......... *H05B 33/0872* (2013.01); *A01K 29/00* (2013.01); *H05B 37/0272* (2013.01); *F21V 23/0442* (2013.01); *F21W 2131/10* (2013.01); *F21Y 2113/13* (2016.08); *F21Y 2115/10* (2016.08)

(58) Field of Classification Search
CPC ............... H05B 37/02; H05B 37/0272; H05B 37/0227; H05B 37/0245; H05B 33/0827; H05B 33/0857; H05B 33/0842; F21Y 2115/10

USPC ............ 315/297, 307, 185 R, 152; 307/157; 362/231, 800

See application file for complete search history.

(56) References Cited

U.S. PATENT DOCUMENTS

| | | | |
|---|---|---|---|
| 2,264,746 A | 12/1941 | Ellwood | |
| 6,783,267 B1 | 8/2004 | Yeoman et al. | |
| 2009/0201676 A1* | 8/2009 | Eynden | F21V 7/005 362/225 |
| 2013/0328482 A1* | 12/2013 | Secilmis | H05B 33/089 315/90 |
| 2015/0173158 A1* | 6/2015 | King | H05B 37/0227 315/158 |

* cited by examiner

*Primary Examiner* — Wei Chan
(74) *Attorney, Agent, or Firm* — Alston & Bird LLP

(57) ABSTRACT

A lighting fixture is provided in which the lighting fixture includes a housing configured to receive a power supply and a plurality of light emitting components positioned near a lens of the lighting fixture. The lighting fixture can operate in a first illumination mode and a second illumination mode. For example, the lighting fixture may provide white in one of the illumination modes and may provide amber light in the other mode. The lighting fixture is also able to be switched between an illuminated state and a non-illuminated state in response to receipt of a user input. The light emitting components can be switched between the first illumination mode and the second illumination mode in response to a magnetized contact applied to the exterior of the housing, where switching between the illuminated state and the non-illuminated state is independent of switching between the first and second illumination modes.

16 Claims, 5 Drawing Sheets

DEVICE AND METHOD FOR MODE CONTROL OF WILDLIFE-FRIENDLY LIGHTING

BACKGROUND

Many systems for lighting a space in or around a home, office or industrial building have multi-functional capabilities. For instance, such systems may provide lighting for daytime or operational lighting, night lighting, and emergency lighting. These various capabilities may be designed, for example, to change the appearance of the light so as to minimize the impact on the natural environment and its animal inhabitants or facilitate egress from a certain area in emergency situations.

Many coastal communities, state departments of Natural Resources, and Fish and Game Bureaus have regulations concerning the utilization of outside lighting during animal nesting seasons, turtle nesting season in Florida being a prime example. These regulations mandate that white light sources must be turned off during the nesting season. This is because when the turtles hatch, the turtles walk towards the moon, which leads them to their natural habitat of the ocean. Artificial white light sources used by humans for nighttime illumination have a tendency to confuse the hatchlings by attracting the hatchlings to walk towards this artificial light source and away from their intended destination of the ocean, often leading to the hatchlings' deaths.

BRIEF SUMMARY OF THE INVENTION

There is therefore a need for a light source that can be utilized during nesting season to provide light for human beachgoers without endangering the turtle hatchlings. Embodiments of the present invention are thus described herein to address this problem that provide for a lighting device that is easily and conveniently switched between white light, e.g., at times of the year when turtle hatchlings are not at risk, and amber light at times when turtle hatchlings may be present. The amber light may be designed to serve as an adequate lighting source for humans, while at the same time not being attractive to turtle hatchlings, such that the amber light does not endanger, confuse, or harm turtle hatchlings. In addition, embodiments of the present invention may also provide a switching mechanism compliant with various gaming regulations, such as the Florida Fish and Wildlife regulations.

Accordingly, systems, devices, and methods for facilitating multi-mode operation, including multi-mode lighting, are provided. In one embodiment, a lighting fixture is provided that comprises a housing comprising a lens, wherein the housing is configured to receive a power supply; a plurality of light emitting components disposed proximate the lens operable in a first illumination mode and a second illumination mode, wherein at least one of the plurality of light emitting components is illuminated in the first illumination mode and at least another of the plurality of light emitting components is illuminated in the second illumination mode; and a circuit board disposed within the housing and configured to support the plurality of light emitting components, wherein the lighting fixture is configured to be switched between an illuminated state and a non-illuminated state in response to receipt of a user input applied remotely from a location of the lighting fixture, wherein the plurality of light emitting components is configured to be switched between the first illumination mode and the second illumination mode in response to a magnetized contact applied to the exterior of the housing, and wherein switching between the illuminated state and the non-illuminated state is independent of switching between the first illumination mode and the second illumination mode.

In some embodiments, the lighting fixture is configured to illuminate in a respective one of the first illumination mode or the second illumination mode based on a previous application of the magnetized contact.

In some embodiments, the exterior of the housing is configured to receive a mode control device configured to apply the magnetized contact.

In some embodiments, the plurality of light emitting components comprises a plurality of light emitting diodes.

In some embodiments, in the first illumination mode at least one of the plurality of light emitting components emits a primary color, and in the second illumination mode at least one of the plurality of light emitting components emits a secondary color.

In some embodiments, the housing further comprises: a first portion comprising the lens and defining a receiving edge; a second portion defining a rim, wherein the receiving edge is configured to engage the rim to hold the first portion and the second portion together.

In some embodiments, the lighting fixture further comprises a support plate disposed between the first portion and the second portion, wherein the support plate defines at least one hole configured to receive at least one fastener therethrough for attaching the first portion to the second portion via the support plate.

In some embodiments, the plurality of light emitting components is disposed between the support plate and the lens.

In some embodiments, the second portion is configured to receive the power supply.

In some embodiments, the circuit board is secured to the inner surface of the second portion.

In some embodiments, the lighting fixture further comprises an illumination module and at least two sensors disposed in the housing, wherein the sensors are configured to detect the application of the magnetized contact to the exterior of the housing and transmit an indication of the magnetized contact to the illumination module, and wherein the illumination module is configured to cause a closed electrical circuit to open and further cause an open electrical circuit to close, thereby changing between the first illumination mode and the second illumination mode, respectively.

In some embodiments, the illumination module comprises non-volatile memory configured to receive the indication from the sensors, wherein the indication from the sensors detecting the application of the magnetized contact on the exterior of the housing serves to change the state of the non-volatile memory to effect the opening and closing of the electrical circuit, respectively.

In other embodiments, a method of manufacturing a lighting fixture is provided. The method may comprise connecting a plurality of light emitting diodes to a diode plate; attaching the diode plate to a support plate; attaching a first portion of a housing to the support plate, wherein the first portion comprises a lens, such that the plurality of light emitting diodes is disposed between the support plate and the lens; attaching a circuit board to an inner surface of a second portion of the housing; attaching the second portion of the housing to the support plate, such that the circuit board is disposed between the inner surface of the second portion and the support plate; configuring the lighting fixture to be switched between an illuminated state and a non-illuminated state in response to receipt of a user input applied remotely from a location of the lighting fixture; and configuring the plurality of light emitting diodes to be switched between a first illumination mode and a second illumination mode in response to a magnetized contact applied to an exterior of the housing, wherein switching between the illuminated state and the non-illuminated state is independent of switching between the first illumination mode and the second illumination mode.

In still other embodiments, a multi-mode device is provided that is operable in a first mode and a second mode. The multi-mode device may comprise a housing; a mode control module disposed within the housing configured to cause the multi-mode device to operate in one of a first mode or a second mode; and at least two sensors disposed proximate an inner surface of the housing, wherein the sensors are configured to detect the application of a magnetized contact to an exterior of the housing and to transmit an indication of the magnetized contact to the mode control module, wherein the mode control module is configured to cause the multi-mode device to operate in one of the first mode or the second mode in response to the receipt of the indication, wherein the multi-mode device is configured to be switched between an active state and a non-active state in response to receipt of a user input, and wherein switching between the active state and the non-active state is independent of switching between the first mode and the second mode.

BRIEF DESCRIPTION OF THE SEVERAL VIEWS OF THE DRAWING(S)

The present invention is illustrated and described herein with reference to the various drawings, in which like reference numbers denote like method steps and/or system components, respectively, and in which.

DETAILED DESCRIPTION OF THE DRAWINGS

Figure 1:
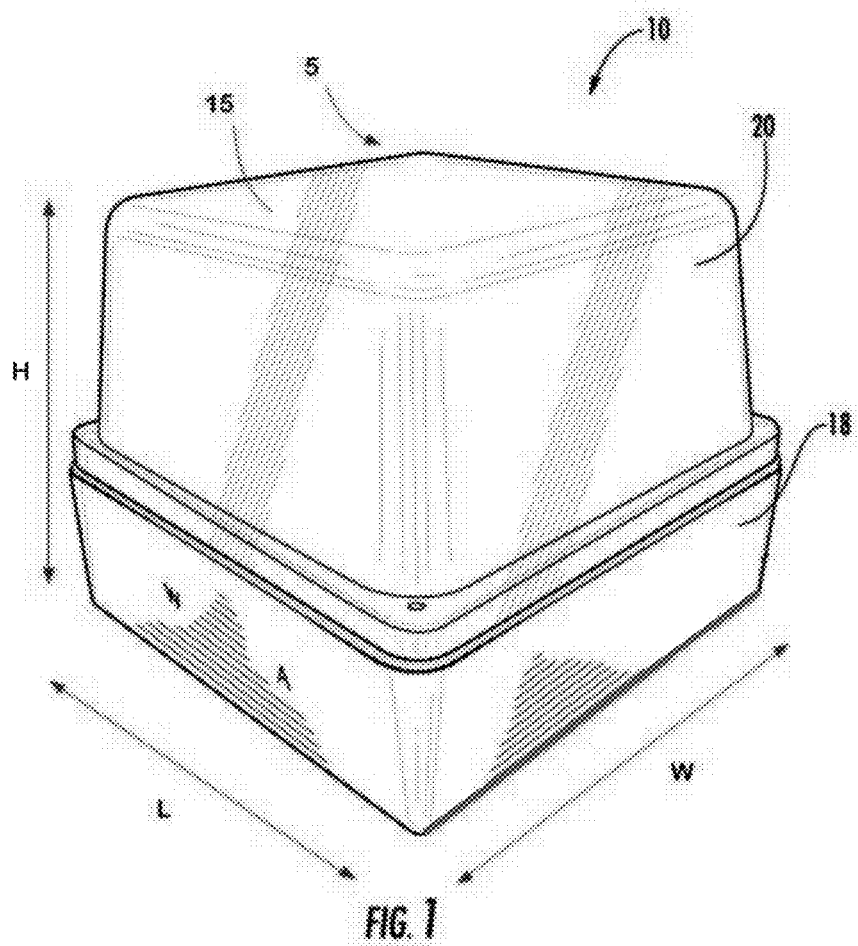
FIG. 1 shows a perspective view of an assembled lighting fixture according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements Like numbers refer to like elements throughout.

Embodiments of the present invention generally relate to multi-mode devices, such as lighting systems, and more specifically, to systems, devices, and methods for switching between different modes of lighting or multiple modes of operation. According to such embodiments, the selection of one of two or more operating modes requires no mechanical penetration of, modification of, passage through, or connection through the housing of the device. Hence, the device as described herein is configured to be intrinsically tamper resistant, which allows the original environmental integrity of the device to be preserved as the original housing is left intact and, thus, has superior performance as compared to conventional multi-mode devices that require the additional attachment of various devices or tools.

Previous methods and techniques for selecting the operating mode of a device involved the installation of one or more switches and some method of providing an appropriate environmental protective system to ensure that the product meets all of the applicable environmental protective requirements. The environmental protective nature of the device is particularly important when the device is electrically-powered. For example, exposed switches and controls may render the product more easily tampered with by unauthorized or untrained individuals. Embodiments of the invention overcome such problems because the device uses an imperceptible (to someone who might wish to tamper with the device) and non-invasive means of selecting between multiple modes of operation while preserving the original environmental integrity of the device.

In the context of lighting fixtures, embodiments of the invention, for example, may include one or more light emitting components, such as light bulbs or light emitting diodes (LEDs), that are configured to be switched between a first illumination mode (e.g., a white light-emitting mode) and a second illumination mode (e.g., an amber light-emitting mode) in response to a magnetized contact applied to the exterior of a housing of the lighting fixture to allow the lighting fixture to be easily and conveniently switched from a white light-emitting mode (e.g., the first illumination mode) to an amber light-emitting mode (e.g., the second illumination mode) that is less likely to endanger, confuse, or harm turtle hatchlings.

Further, in conventional lighting fixtures, it is standard practice to use a white LED, or other white light sources, for lighting a space around a human residence, such as a beach home. As noted above, however, the use of white light sources can confuse certain animals, such as turtle hatchlings, as the white light can attract the turtle hatchlings away from the path to the ocean provided by following the light from the moon. In other words, the turtle hatchlings may move towards the light fixtures emitting the white light, instead of following the light of the moon towards the ocean. Unfortunately, the turtle hatchlings deceived by the artificial white light source often do not make it to the ocean and, ultimately, die ashore. In turn, the preservation of the eco-system is compromised.

To address this problem, many residents of beach homes choose or are obligated to turn off such conventional white light sources, for example due to regulations, to prevent the white light source from attracting the turtle hatchlings. Because lighting fixtures serve to provide light, or visibility, in otherwise dark or dimly-lit areas, the inability to use conventional lighting fixtures that can only emit white light during nesting season can create hazards to the human residents, such as tripping hazards, and decrease security (actual or perceived), or at the very least inconvenience those residents.

Turning now to FIG. 1, a lighting fixture 10 according to embodiments of the invention is shown. The lighting fixture 10 may include a housing 5 comprising a first portion 20 and a second portion 18 that fit together to form the housing. The first portion 20 may include a lens 15 through which the light provided by a plurality of light emitting diodes located within the housing (and not visible in FIG. 1) may pass. A power supply (not shown) may also be included to provide power from an energy source to the electrical components of the lighting fixture 10. The power supply may, for example, include wiring (as depicted) that is connected to an electrical outlet or source, or in other cases may additionally or alternatively comprise a battery, such as a battery located inside the housing.

The first and second portions 20, 18 of the housing 5 may be made of material such as some types of rubber, plastic, or aluminum. The housing 5 may be configured (e.g., sized and shaped) to accommodate different sizes, numbers, or types of light emitting diodes, bulbs, lamps, or multiple lamps (e.g., two circuit boards with LEDs connected in series). In the depicted embodiment, for example, the housing 5 is made of impact resistant polycarbonate and measures a length (L), width (W), and height (H) configured to accommodate the various components (e.g., diode plate, circuit board, light emitting diodes) described herein.

As depicted, the housing 5 may be configured to receive the power supply. The power supply may include one or more components, such as a transformer assembly, a rectifier, a filter, and/or a regulator circuit, etc. In this regard, the power supply may be operable in response to receipt of a user input applied remotely from a location of the lighting fixture 10. For example, the power supply may be operable in response to a user actuating a switch located within a beach home though the lighting fixture 10 is located outside of the beach home (e.g., mounted to an exterior wall of the home). In this regard, the power supply may be operable via a wireless input. Such wireless actuation of the power supply may include one or more components operable in magnetic fields or electromagnetic fields (e.g., near-fields or far-fields) and may include one or more transmitters, one or more receivers, or the like. Alternatively or additionally, the power supply may be operable via a wired connection between the lighting fixture 10 and the switch or other actuator (not shown). In some cases, the switch may not be remote and may, for example, be a switch provided on the lighting fixture 10 itself, such as disposed proximate to the exterior of the housing 5.

Figure 2:
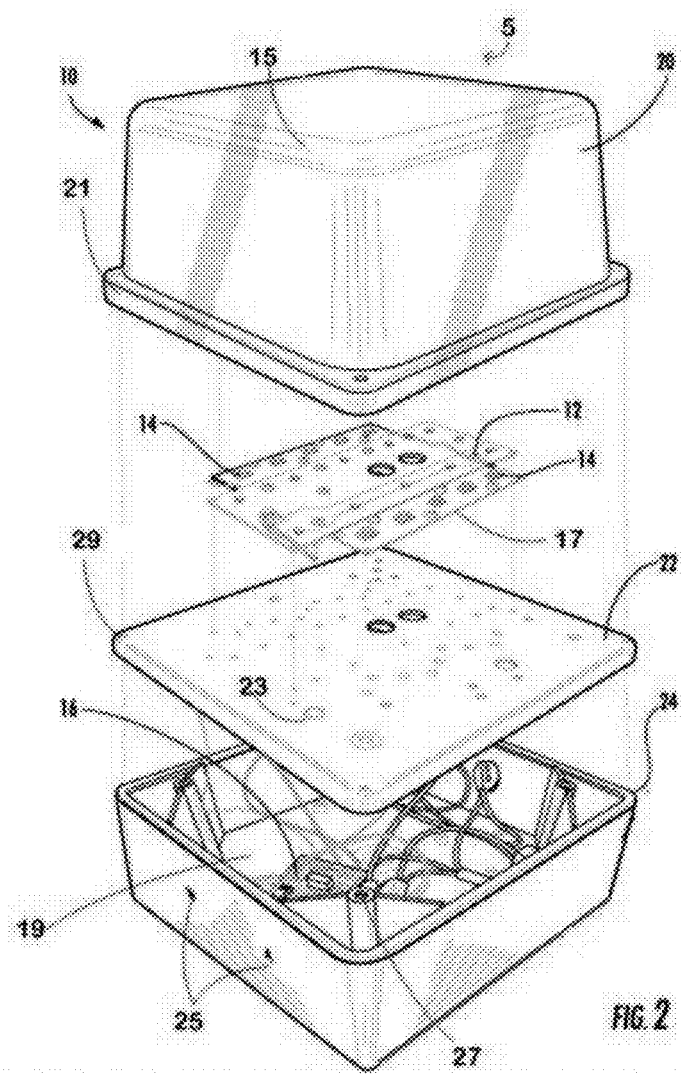
FIG. 2 is an exploded perspective view of the lighting fixture of FIG. 1 according to an example embodiment.

An exploded view of the lighting fixture 10 according to one embodiment is shown in FIG. 2. As depicted, the housing 5 may comprise a first portion 20 comprising the lens 15. The first portion 20 may be configured to define a receiving edge 21. The housing 5 may also include a second portion 18 configured to receive the power supply described above. In some embodiments the second portion 18 defines a rim 24. To that end, the receiving edge 21 may be configured to engage the rim 24 to hold the first portion 20 and the second portion 18 together. For example, the receiving edge may include a surface that is configured to rest upon the rim and holds the first portion 20 and the second portion 18 together when the components are assembled as shown in FIG. 1.

The lens 15 may serve to diffuse the light emitted by the light emitting diodes 14 to illuminate the space that is lit by the lighting fixture 10. The lens 15 may, for example, be made of glass or plastic. In some cases, for example, the lens 15 may be made of extruded polycarbonate (PC) material or other plastic. In other embodiments, glass may be used to construct the lens. Glass, however, may be less desirable for use as the lens 15 than plastic material in some applications or environments because plastic material may withstand the climate and/or environment better than glass and may be less prone to breaking or shattering. In addition, although the glass lens may be selected to deliver a similar toughness to a plastic lens, the use of a glass lens may significantly increase the weight of the fixture, for example as compared to a PC or polymethyl methacrylate (PMMA) lens.

As noted above, the lighting fixture 10 includes a plurality of light emitting diodes 14 disposed proximate the lens 15. In some embodiments the plurality of light emitting diodes 14 is disposed proximate a diode plate 17 (e.g., a printed wire board). To provide support to the light emitting diodes 14, the diode plate 17 may be configured to receive the light emitting diodes 14, such as via soldering or other attachment of the light emitting diodes to the diode plate.

The diode plate 17 may define at least one hole configured to receive at least one fastener therethrough to attach the diode plate 17 to the support plate 22. As illustrated, the diode plate 17 may be configured to attach to the support plate 22 via one or more fasteners 12 (e.g., a nail, screw, bolt, or other type of mechanical faster), such that the plurality of light emitting diodes 14 is disposed between the support plate 22 and the lens 15. The diode plate 17 may be made of a material such as some types of copper, aluminum, resin-impregnated fiberglass, and/or other type of dielectric materials. In the depicted embodiment, the diode plate 17 is configured (e.g., sized and shaped according to the particular desired optical or thermal performance that is required) to support at least one of the plurality of light emitting diodes 14. For example, in the depicted embodiment, the diode plate 17 may be approximately 4 to 5 inches wide and approximately 5 to 6 inches long. In other embodiments, the diode plate 17 may be wider, longer, or otherwise proportioned to accommodate other sizes of light emitting diodes, bulbs, lamps, or multiple lamps.

As noted above, the support plate 22 may be disposed between the first and second portion 18. In some embodiments, the support plate 22 may define at least one hole 29, the one hole 29 being configured to receive a fastener, such as a screw, bolt, nut, rivet, pin, or other fastener, therethrough for attaching the first portion 20 of the housing 5 to the second portion 18 of the housing. In further embodiments, the support plate 22 may include an access opening 23 that is configured to allow passage of electrical wiring from the power supply to the diode plate 17. The support plate 22 may be made of material such as some types of aluminum, copper, or other structurally sound and thermally conductive material to serve as a heat sink for the light emitting diodes 14 supported by the support plate 22. In further embodiments, the support plate 22 may be configured to provide a ground potential for dead-metal items (e.g., the support plate may be electrically-conductive). In the depicted embodiment, the support plate 22 may be configured (e.g., sized and shaped) to support a diode plate (e.g., the diode plate 17 and one or more LEDs 14). For example, in the depicted embodiment, the support plate 22 may be approximately 8 to 9 inches wide by 8 to 9 inches long. In other embodiments, the support plate 22 may be wider and/or longer to accommodate other sizes or types of diode plates, light emitting diodes, or lamps.

Figure 3:
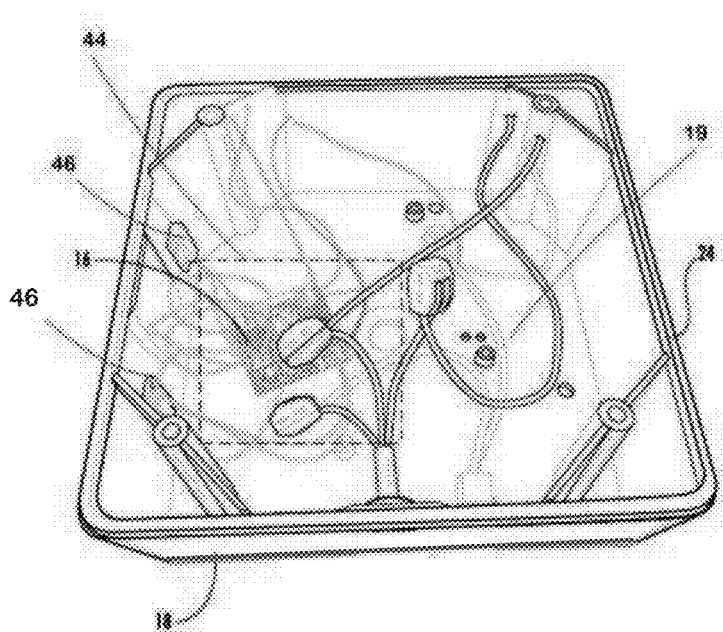
FIG. 3 is a top perspective view showing the inside of the second portion including a circuit board and wiring according to an example embodiment.

The second portion 18 may be configured to support a circuit board 16 (e.g., a printed circuit board) disposed within the housing 5, and the circuit board in turn may be configured to support the plurality of light emitting diodes 14 as described herein with reference to FIG. 3. In this regard, the circuit board 16, also illustrated in FIG. 2, may be secured to an inner surface 19 of the second portion 18 of the housing 5.

There may be times when it is desirable, or necessary (e.g., during nesting season), for the lighting fixture 10 to operate in a first, second, or multi-mode configuration. In this regard, the plurality of light emitting diodes 14 may be operable in a first illumination mode and a second illumination mode in response to a magnetized contact applied to the exterior of the housing 5. At least one of the plurality of light emitting diodes 14 may be illuminated in the first illumination mode, and at least another of the plurality of light emitting diodes may be illuminated in the second illumination mode. In the first illumination mode, for example, at least one of the light emitting diodes 14 may emit a primary color. For example, at least one of the light emitting diodes 14 may emit a white light in the first illumination mode. As described above, the emission of the white light while operating in, for example, the first illumination mode may pose a risk to sea life, such as the turtle hatchlings, at certain times of the year because the white light may attract such sea life away from their natural habitat, the sea.

In the second illumination mode, at least one of the plurality of light emitting diodes 14 may emit a secondary color. For example, at least one of the light emitting diodes 14 may emit an amber light. While operating in the second illumination mode (e.g., while emitting an amber light), the lighting fixture 10 may thus continue to provide light for humans to see their surroundings, but at the same time that light is less likely to attract turtles away from the sea.

In some embodiments, the lighting fixture 10 may be configured to illuminate in a respective one of the first illumination mode or second illumination mode based on a previous application of the magnetized contact. For example, the mode control device 36 may be configured to apply a magnetized contact to the exterior housing 5 of the second portion 18, effectively placing the lighting fixture 10 in a respective first or second illumination mode (e.g., based on a location of the contact, as described above) which then allows either the white light or the amber light emitting diode(s) to be illuminated (depending on the mode selected) when the lighting fixture 10 is placed in the illuminated state (e.g., turned on). As an example, the lighting fixture 10 may be operating in a first illumination mode (e.g., emitting at least one white light emitting diode) based on the user's mode selection. The lighting fixture 10 may continue to operate in the same illumination mode (e.g., the first illumination mode in this example) until another magnetized contact is provided in a location corresponding to the second illumination mode, at which time the lighting fixture 10 would begin operating in the second illumination mode. In other words, the lighting fixture 10 is configured to retain the last selected operating mode even when power is removed.

With continued reference to FIG. 3, an inner surface 19 of the second portion 18 of the housing is shown with various components that may be disposed within the second portion. To manage the operation of the light emitting diodes 14 disposed, for example, on the diode plate 17, an illumination module 44 and at least two sensors 46 may be provided in the housing 5, such as on the inner surface 19 of the second portion 18. The sensors 46 may comprise one or more transducers and/or one or more switches operable to detect, measure, record, indicate, or otherwise respond to one or more properties of an input received from the physical environment. For example, the sensors 46 may be magnetic sensors operable to respond to the presence of a magnetized object or device that are placed in proximity to a respective sensor. Any noticeable shift in contact with or proximity to the sensors 46 may cause the plurality of light emitting diodes 14 to operate in the first illumination mode or the second illumination mode via electrical components and circuitry provided by the illumination module 44.

In some embodiments, for example, the sensors 46 may be configured to detect the application of the magnetized contact to the exterior of the housing 5 and transmit an indication of the magnetized contact to the illumination module 44. To that end, the illumination module 44 may be configured to cause a closed electrical circuit to open. Alternatively, or additionally, the illumination module 44 may be configured to cause an open electrical circuit to close, thereby changing between the first illumination mode and the second illumination mode. The illumination module 44 may include one or more circuit boards 16, resistors, relays, capacitors, or other circuitry components operable via the circuit board 16 (which may, e.g., be a printed circuit board). In further embodiments, the illumination module 44 may comprise non-volatile memory. The non-volatile memory may be configured to receive the indication from sensors 46. The indication from the sensors 46 detecting the application of the magnetized contact on the exterior of the housing 5 may thus serve to change the state of the memory to affect the opening and closing of the electrical circuit.

Figure 4:
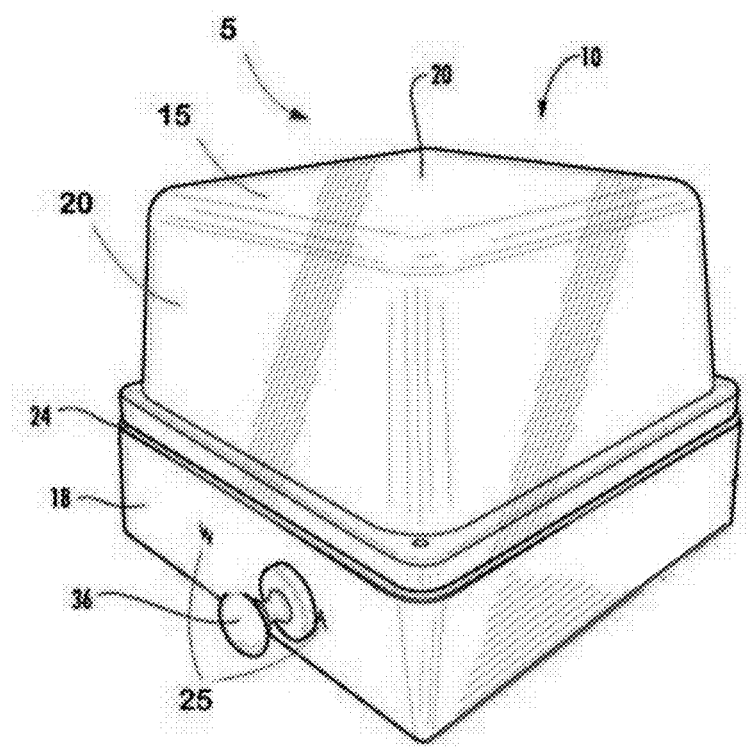
FIG. 4 shows a perspective view of the lighting fixture of FIG. 1 with a mode control device according to an example embodiment.

Turning to FIG. 4, a perspective view of the lighting fixture 10 is shown, where a mode control device 36 comprising magnetic properties or capable of creating a magnetic field is being applied to the exterior of the housing 5 according to an example embodiment. The mode control device 36 may be made of one or more materials such as nickel, aluminum, rubber, plastic, or a combination of the same. For example, the mode control device 36 may include a handle or grip (e.g., an outer surface of the device) for the user to hold made out of plastic or other non-ferrous material, while an internal component of the mode control device may comprise a material comprising magnetic properties (e.g., iron, ferromagnetic metals, or ferrimagnetic compounds) as described above.

The plurality of light emitting diodes 14 may thus be configured to be switched between the first illumination mode and the second illumination mode in response to a magnetized contact applied to the exterior of the housing 5, e.g., via the mode control device 36. For example, the mode control device 36 is positioned against the exterior of the housing 5 as shown in FIG. 4 to provide the magnetized contact, and at least one of the plurality of light emitting diodes 14 may operate in the first illumination mode, such as by actuating or illuminating at least one white light emitting diode. When the mode control device 36 is used to apply the magnetized contact to the exterior of the housing 5 in a different location (e.g., proximate a different sensor 46 located inside the housing, as described above), at least one of the plurality of light emitting diodes 14 may be switched from operation in the first illumination mode to operation in the second illumination mode. As a result, the light emitting diodes capable of emitting amber light, for example, may be actuated.

As shown in FIGS. 2 and 4, one or more mode indicators 25 may be disposed proximate to the exterior housing 5. The mode indicators 25 may indicate where to place the mode control device 36 to effect a particular mode of operation of the lighting fixture 10. As described above, the sensors 46 may comprise one or more transducers and/or one or more switches operable to respond to one or more properties (e.g., magnetic properties provided by the mode control device 36 upon application of the mode control device 36 to a respective one of the mode control indicators 25). For example, when the mode control device 36 is applied to or near a mode control indicator 25 (e.g., the indicator labeled "W" or "A"), the sensors 46 disposed proximate the mode control indicators 25 may detect a shift in the magnetic field. The sensors 46 may, e.g., be disposed on the interior side of the housing with respect to the indicators 25 provided on the exterior surface. In turn, the illumination module 44 may cause a closed electrical circuit to open or an open electrical circuit to close, thereby causing at least one of the plurality of light emitting diodes 14 to illuminate. For example, when a magnetized contact (e.g., via the mode control device 36) is applied to the mode indicator 25 labeled "W," at least one of the plurality of light emitting diodes 14 may illuminate a white light. Alternatively, or additionally, when a magnetized contact is applied to the mode indicator 25 labeled "A," at least one of the plurality of light emitting diodes 14 may be configured to emit an amber color.

As described above, the lighting fixture 10, in some embodiments, may be configured to be switched between an illuminated state and a non-illuminated state in response to receipt of user input applied remotely from a location of the lighting fixture 10 as described herein with respect to FIG. 2. For example, the lighting fixture 10 may be powered on (e.g., when placed in the illuminated state), thereby receiving electrical energy via the power supply to illuminate the respective light emitting diodes 14. The lighting fixture 10, however, may also be placed in a non-illuminated state (e.g., a reduced energy state, such as a sleep mode, or powered off).

Although the lighting fixture 10 may be in either a first or second illumination mode, as described above, the plurality of light emitting diodes 14 may be configured to switch between the illuminated state and the non-illuminated state (e.g., turn on or off) independently of switching between the first and second illumination modes. Thus, although set to illuminate the amber light emitting diodes only (e.g., in the second illumination mode), those light emitting diodes may either be turned on or off, depending on whether the lighting fixture 10 is in the illuminated or non-illuminated state. The illuminated or non-illuminated stated may be triggered in response to receipt of a user input (e.g., a user flipping a switch, depressing a button, depressing a dimmer, or otherwise providing an input that affects one or more switches, relays, or other like circuits) applied remotely from a location of the lighting fixture 10, as described above.

For example, the lighting fixture 10 may be powered on (e.g., placed in the illuminated state) in response to a user actuating a light switch. While in the illuminated state, the lighting fixture 10 may be operating in the first illumination mode (e.g., actuating at least one white light emitting diode). The lighting fixture 10 may later be switched by the user to the non-illuminated state (e.g., powered off) in response to the user depressing a light switch. Although the lighting fixture may be switched between the illuminated state and the non-illuminated state, the lighting fixture 10 may still, for example, operate in the first illumination mode (e.g., may continue to operate in the white light mode). In other words, the last selected mode (in this example, the first illumination mode) will be retained, or remembered, by the illumination module 44 without the need for any external or stored energy. Thus, when the lighting fixture 10 is powered on, at least one white light emitting diode will remain operable until the illumination mode is switched (which may occur via application of the mode control device either when the lighting fixture is in the illuminated state or in the non-illuminated state), thereby allowing the illumination state to be changed independently of the illumination mode.

Figure 5:
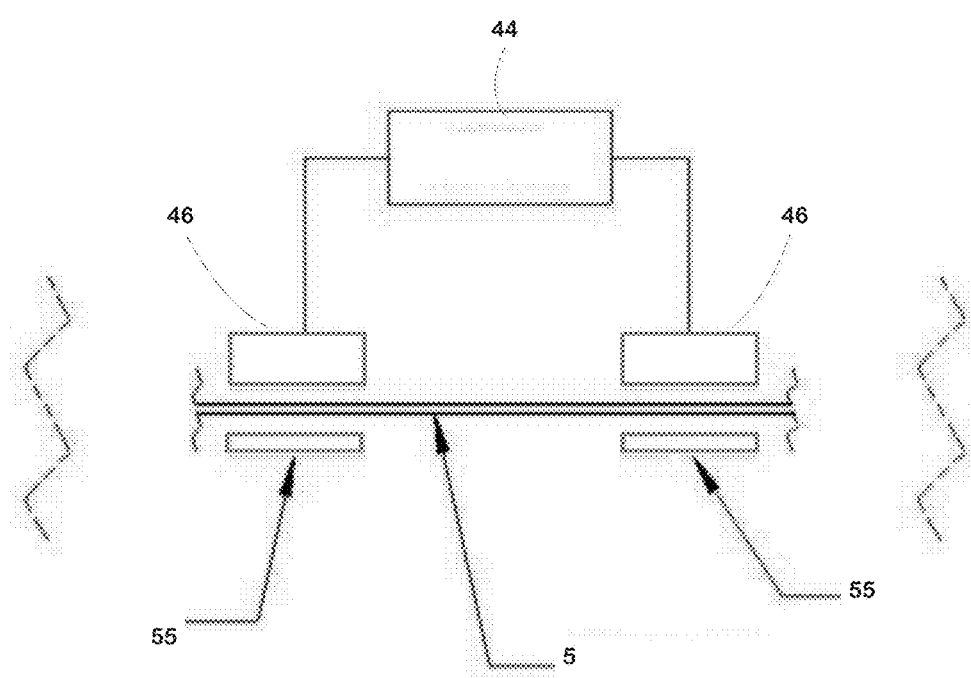
FIG. 5 shows a schematic diagram of a multi-mode device according to an example embodiment.

With reference to FIG. 5, a diagram of a multi-mode device according to an example embodiment is illustrated. The multi-mode device (which may be, e.g., a lighting fixture as described above, a printer, a photocopier, a door, etc.) may be operable in a first mode and a second mode. In some embodiments, the multi-mode device may include a housing configured to receive a power supply to provide power from an energy source to the electrical components of the multi-mode device as described herein above. The housing may be made of material such as some types of rubber, plastic, or aluminum. The housing may be configured to meet UL (Underwriters Laboratories) 1598, the Standard for Luminaires, UL 2225, the Standard for Cables and Cable-Fittings for Use in Hazardous (Classified) Locations, and/or any other standards applicable or required for the particular type of multi-mode device. In the depicted embodiment of FIG. 1, for example, the housing 5 may be configured to meet the UL 1598 and 2225 standards. To that end, the housing 5 may be configured to be weatherproof, so as to protect internal components from intrusion by water and foreign bodies (e.g., the housing may completely surround the internal components and may not define holes). The housing 5 may be further configured to provide other types of protection, such as shock protection. Accordingly, embodiments of the invention described above may provide a non-invasive means of selecting multi-modes of operations while preserving the original environmental integrity of the housing 5 by not requiring any physical modifications of the housing.

To manage the operation of the multi-mode device, a mode control module 44 (e.g., an illumination module in the example of a lighting fixture described above, or other module comprising electrical components or circuitry configured to effect the mode of operation of a multi-mode device) and at least two sensors 46 may be provided in the housing 5. The sensors 46 may comprise one or more transducers and/or one or more switches operable as described above with respect to the lighting fixture 10 of FIGS. 1-4. The mode control module 44 may be configured to cause the multi-mode device to operate in one of a first mode or a second mode. For example, the mode control module 44 may cause a photocopier to operate in a first mode, in which the photocopier is configured to permit only authorized users (e.g., users providing a passcode or other input for authentication) to make photocopies, or in a second mode, in which any user can use the photocopier and no authorization inputs are requested or required. The sensors 46 may be configured to detect the application of a magnetized contact 55 (e.g., as described above in the context of a lighting fixture) to the exterior of the housing 5 and transmit an indication of the magnetized contact 55 to the mode control module 44. In turn, the mode control module 44 may be configured to cause the multi-mode device (the photocopier in this example) to operate in one of the first mode (e.g., only authorized use) or the second mode (e.g., any use) in response to the receipt of the indication.

In other examples, the mode control module 44 may cause a doorway configured to facilitate ingress to and egress from a secured area to operate in one of a first mode (e.g. a secured mode, in which only authorized personnel are provided entry) or a second mode (e.g., an unsecured mode, in which anyone is provided entry). The sensors 46 may be configured to detect the application of a magnetized contact 55 to the exterior of the housing 5 and transmit an indication of the magnetized contact 55 to the mode control module 44. In turn, the mode control module 44 may be configured to cause the doorway to operate in the first mode, in which the door only opens in response to a user providing an authorization input, such as a passcode or badge swipe, or in the second mode, in which any user may open the door without providing any such input.

Regardless of the actual device, and as described above, the operating mode of the device may be switched to the first mode through application of the magnetized contact 55 proximate a sensor 46 associated with the first mode (e.g., the leftmost sensor in FIG. 5). Similarly, the operating mode of the device may be switched to the second mode through application of the magnetized contact 55 proximate a sensor 46 associated with the second mode (e.g., the rightmost sensor in FIG. 5). As a result, a corresponding indication (e.g., from the actuated sensor 46) would be transmitted to the mode control module 44, and the mode control module would in turn cause the device to operate according to the respective mode that is selected.

In some embodiments, the multi-mode device may be configured to be switched between an active state (e.g., an illuminated state in the context of a lighting fixture, or other "turned on" state operable by electrical energy) and a non-active state (e.g., a non-illuminated state in the context of the lighting fixture, or otherwise inoperable or "turned off" state) in response to receipt of a user input. Switching between the active state and the non-active state may be independent of switching between the first mode and the second mode, as described above in the context of the lighting fixture example.

In further embodiments, the mode control module may be configured to cause the multi-mode device to operate in one of the first mode or the second mode in response to the receipt of the indication by causing a closed electrical circuit to open and further causing an open electrical circuit to close, thereby changing between the first mode and the second mode as described above with reference to FIG. 3 in the example of the lighting fixture.

Furthermore, the mode control module may comprise non-volatile memory configured to receive the indication from the sensors such that the indication from the sensors detecting the application of the magnetized contact on the exterior of the housing serves to change the state of the non-volatile memory to effect the opening and closing of the electrical circuit, respectively.

Accordingly, as described above, embodiments of the invention described above are applicable to a variety of different multi-mode devices, including lighting fixtures (e.g., to facilitate switching between operating in a white light mode and a turtle-friendly amber light mode), photocopiers, doorways, or any other devices that are configured to operate in two or more modes.

With respect to embodiments of a lighting fixture, in some embodiments, a method of manufacturing a lighting fixture is provided, in which a plurality of light emitting diodes is connected to a diode plate as described above. The diode plate may be attached to a support plate. A first portion of the housing may be attached to the support plate, where the first portion comprises a lens, such that the plurality of light emitting diodes is disposed between the support plate and the lens. A circuit board may be attached to an inner surface of a second portion of the housing. The second portion of the housing may be attached to the support plate, such that the circuit board is disposed between the inner surface of the second portion and the support plate. A power supply may be disposed or at least partially received within the second portion.

In some embodiments, the first portion may define a receiving edge, and the second portion may define a rim. Attaching the first and second portions of the housing to the support plate, respectively, may comprise engaging the receiving edge with the rim to hold the first portion and the second portion together, as described above.

In addition, the lighting fixture may be configured to switch between an illuminated state and a non-illuminated state in response to receipt of a user input applied remotely from a location of the lighting fixture. The plurality of light emitting diodes may further be configured to switch between a first illumination mode and a second illumination mode in response to a magnetized contact applied to an exterior of the housing, where switching between the illuminated state and the non-illuminated state is independent of switching between the first illumination mode and the second illumination mode.

In some cases, an illumination module and at least two sensors may be disposed in the housing, where the sensors are configured to detect the application of the magnetized contact to the exterior of the housing and transmit an indication of the magnetized contact to the illumination module and where the illumination module is configured to cause a closed electrical circuit to open and further cause an open electrical circuit to close, thereby changing between the first illumination mode and the second illumination mode, respectively.

Yet in further cases, the illumination module may comprise non-volatile memory configured to receive the indication from the sensors, where the indication from the sensors detecting the application of the magnetized contact on the exterior of the housing serves to change the state of the non-volatile memory to effect the opening and closing of the electrical circuit, respectively.

Embodiments of the lighting fixture 10 described above with reference to FIGS. 1-4 include an exterior of the housing configured to receive a mode control device configured to apply the magnetized contact. In such embodiments, the first illumination mode at least one of the plurality of light emitting diode emits a primary color and in the second illumination mode at least one of the plurality of light emitting diodes emits a secondary color.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although only certain components and configurations (e.g., arrangements of circuit boards, light emitting diodes, lenses, etc.) are shown in the figures and described above, it is understood that additional components may be included for enhancing the functionality and/or improving the performance of the lighting fixture.

Although specific terms are employed herein, they are used in a generic and descriptive sense only and not for purposes of limitation.

That which is claimed:

1. A lighting fixture comprising:
   a housing comprising a lens, wherein the housing is configured to receive a power supply;
   an illumination module and at least two sensors disposed in the housing, wherein the sensors are configured to detect an application of a magnetized contact to an exterior of the housing and transmit an indication of the magnetized contact to the illumination module;
   a plurality of light emitting components disposed proximate the lens operable in a first illumination mode and a second illumination mode, wherein at least one of the plurality of light emitting components is illuminated in the first illumination mode and at least another of the plurality of light emitting components is illuminated in the second illumination mode; and a circuit board disposed within the housing and configured to support the plurality of light emitting components, wherein the lighting fixture is configured to be switched between an illuminated state and a non-illuminated state in response to receiving a user input applied remotely from a location of the lighting fixture, wherein the illumination module is configured to cause a closed electrical circuit to open or cause an open electrical circuit to close, thereby changing between the first illumination mode and the second illumination mode, respectively, in response to the application of the magnetized contact wherein the illumination module comprises non-volatile memory configured to receive the indication from the sensors, wherein the indication from the sensors serves to change the state of the non-volatile memory to effect the opening and closing of the electrical circuit, such that the lighting fixture is configured to operate in one of the first illumination mode or the second illumination mode, respectively, until another magnetized contact is applied, and wherein switching between the illuminated state and the non-illuminated state is independent of switching between the first illumination mode and the second illumination mode such that the lighting fixture operating in a respective one of the first illumination mode or the second illumination mode is configured to remain operating in the respective one of the first illumination mode or the second illumination mode upon switching from the non-illuminated state to the illuminated state in the absence of the magnetized contact being applied.

2. The lighting fixture of claim 1, wherein the lighting fixture is configured to illuminate in a respective one of the first illumination mode or the second illumination mode based on a previous application of the magnetized contact.

3. The lighting fixture of claim 1, wherein the plurality of light emitting components comprises a plurality of light emitting diodes.

4. The lighting fixture of claim 1, wherein in the first illumination mode at least one of the plurality of light emitting components emits a primary color and wherein in the second illumination mode at least one of the plurality of light emitting components emits a secondary color.

5. The lighting fixture of claim 1, wherein the housing further comprises:
a first portion comprising the lens and defining a receiving edge;
a second portion defining a rim, wherein the receiving edge is configured to engage the rim to hold the first portion and the second portion together.

6. The lighting fixture of claim 5, further comprising a support plate disposed between the first portion and the second portion, wherein the support plate defines at least one hole configured to receive at least one fastener therethrough for attaching the first portion to the second portion via the support plate.

7. The lighting fixture of claim 6, wherein the plurality of light emitting components is disposed between the support plate and the lens.

8. The lighting fixture of claim 5, wherein the second portion is configured to receive the power supply.

9. The lighting fixture of claim 5, wherein the circuit board is secured to the inner surface of the second portion.

10. A method of manufacturing a lighting fixture comprising:
connecting a plurality of light emitting diodes to a diode plate;
attaching the diode plate to a support plate;
attaching a first portion of a housing to the support plate, wherein the first portion comprises a lens, such that the plurality of light emitting diodes is disposed between the support plate and the lens;
attaching a circuit board to an inner surface of a second portion of the housing;
attaching the second portion of the housing to the support plate, such that the circuit board is disposed between the inner surface of the second portion and the support plate;
disposing an illumination module and at least two sensors in the housing, wherein the sensors are configured to detect an application of a magnetized contact to an exterior of the housing and transmit an indication of the magnetized contact to the illumination module; and
configuring the lighting fixture to be switched between an illuminated state and a non-illuminated state in response to receiving a user input applied remotely from a location of the lighting fixture,
wherein the illumination module is configured to cause a closed electrical circuit to open or cause an open electrical circuit to close, thereby changing between the first illumination mode and the second illumination mode, respectively, in response to the application of the magnetized contact,
wherein the illumination module comprises non-volatile memory configured to receive the indication from the sensors, wherein the indication from the sensors serves to change the state of the non-volatile memory to effect the opening and closing of the electrical circuit, such that the lighting fixture is configured to operate in one of the first illumination mode or the second illumination mode, respectively, until another magnetized contact is applied, and
wherein switching between the illuminated state and the non-illuminated state is independent of switching between the first illumination mode and the second illumination mode such that the lighting fixture operating in a respective one of the first illumination mode or the second illumination mode is configured to remain operating in the respective one of the first illumination mode or the second illumination mode upon switching from the non-illuminated state to the illuminated state in the absence of the magnetized contact being applied.

11. The method of claim 10, wherein in the first illumination mode at least one of the plurality of light emitting diode emits a primary color.

12. The method of claim 10, wherein in the second illumination mode at least one of the plurality of light emitting diodes emits a secondary color.

13. The method of claim 10, wherein the first portion defines a receiving edge and the second portion defines a rim, wherein attaching the first and second portions of the housing to the support plate, respectively, comprises engaging the receiving edge with the rim to hold the first portion and the second portion together.

14. The method of claim 10 further comprising disposing a power supply within the second portion.

15. A multi-mode device operable in a first mode and a second mode comprising:
- a housing;
- a mode control module disposed within the housing configured to cause the multi-mode device to operate in one of a first mode or a second mode; and
- at least two sensors disposed proximate an inner surface of the housing,
- wherein the sensors are configured to detect an application of a magnetized contact to an exterior of the housing and to transmit an indication of the magnetized contact to the mode control module,
- wherein the mode control module is configured to cause the multi-mode device to operate in one of the first mode or the second mode in response to the receipt of the indication by causing a closed electrical circuit to open or causing an open electrical circuit to close, respectively,
- wherein the mode control module comprises non-volatile memory configured to receive the indication from the sensors, wherein the indication from the sensors serves to change the state of the non-volatile memory to effect the opening and closing of the electrical circuit, such that the multi-mode device is configured to operate in one of the first mode or the second mode, respectively, until receipt of another indication of the magnetized contact being applied,
- wherein the multi-mode device is configured to be switched between an active state and a non-active state in response to receiving a user input, and
- wherein switching between the active state and the non-active state is independent of switching between the first mode and the second mode such that the multi-mode device operating in a respective one of the first mode or the second mode is configured to remain operating in the respective one of the first mode or the second mode upon switching from the non-active state to the active state in the absence of the magnetized contact being applied.

16. The multi-mode device of claim 15, wherein the multi-mode device is a lighting fixture.

* * * * *